O. ROEDEL.
PLATING HOOK.
APPLICATION FILED SEPT. 4, 1918.
1,308,508.
Patented July 1, 1919.
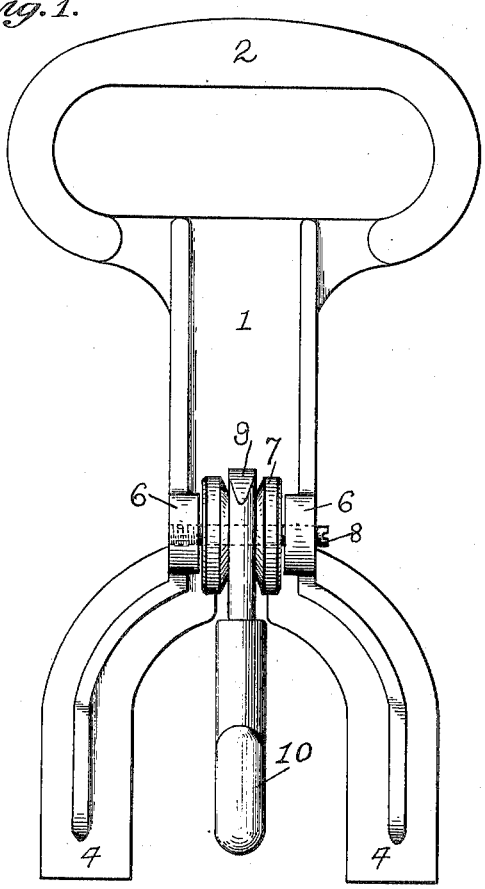
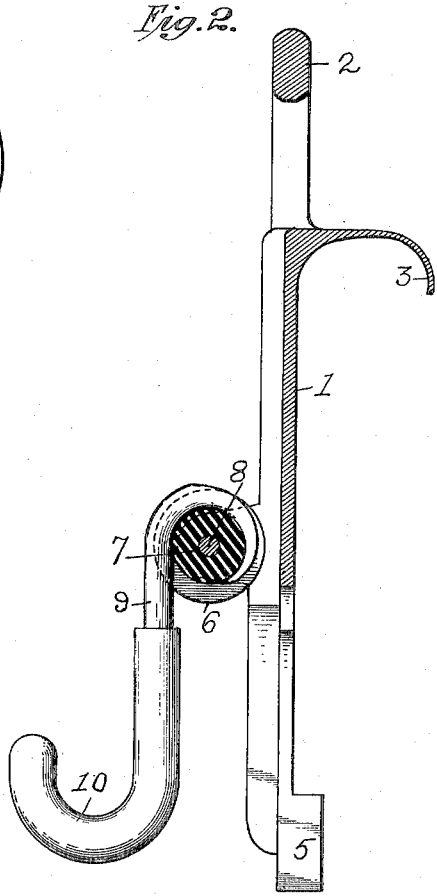
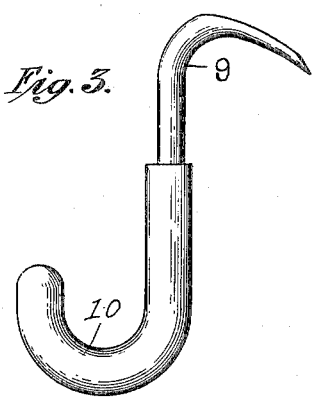
Otto Roedel
INVENTOR
BY Robert B Kilgore
ATTORNEY

UNITED STATES PATENT OFFICE.

OTTO ROEDEL, OF JERSEY CITY, NEW JERSEY.

PLATING-HOOK.

1,308,508.    Specification of Letters Patent.    Patented July 1, 1919.

Application filed September 4, 1918. Serial No. 252,510.

*To all whom it may concern:*

Be it known that I, OTTO ROEDEL, a citizen of the United States, residing at Jersey City, in the county of Hudson and State of New Jersey, have invented certain new and useful Improvements in Plating-Hooks, of which the following is a specification.

My invention relates to hooks for suspending cathodes or anodes in electro-plating baths and it is my object to produce a hook which will have ample electrical connection with the bus bar, in which a portion of the hook proper will be protected from corrosion, in which decomposed hooks can be quickly, easily and cheaply replaced, in which the electrical connection between the hook and the cathode or anode will be solid and firm. Another object is to provide insulation between the hook proper and the carrier to prevent plating on the back of the form.

In the drawing Figure 1 is a front view of my improved hook; Fig. 2 a vertical sectional view of the structure of Fig. 1; and Fig. 3 a view of a hook proper.

The complete hook comprises a shank 1 having a handle 2 and a long lip 3 adapted to hang on the bus bar of a plating tank. The shank is bifurcated below the lip and has legs 4—4 provided with contact blocks 5—5 on their rear. Below the handle and at the top of the bifurcation are lugs 6—6. A bushing 7 is mounted between the lugs and is held in place by a screw 8. The hook proper 9 is S-shaped and has one end secured around the bushing and the other end covered with some non-corrosive metal such as lead.

In use the lead hook is swung between the bifurcations and the anode or cathode is hung from the lead covered end of the hook proper and pressed against the blocks 5—5 by its own weight making a solid joint and a perfect electrical contact.

The hook proper being insulated from the shank will not conduct current to the back of the form being plated.

If a hook 9 is to be replaced the screw 8 can be removed the bushing 7 taken out and a new hook 9 closed around it after which it is replaced in the shank. By this construction the hooks can be quickly and cheaply replaced in the shank and the whole hook made as good as new.

If desired the bushing 7 may be made of insulating material whereby the hook proper 9 is electrically insulated from the carrier.

I claim:—

1. A plating hook comprising a shank, a lip on said shank adapted to rest on a bus bar, a bushing detachably secured on the shank and a hook proper secured to the bushing, whereby the hook is free to swing with respect to the shank.

2. A plating hook comprising a shank, a lip on said shank adapted to rest on a bus bar, a bifurcated extension below the lip, a bushing detachably secured to the shank and a hook proper secured to the bushing, whereby the hook is free to swing between the bifurcations.

3. A plating hook comprising a shank, a lip on said shank adapted to rest on a bus bar, a bifurcated extension below the lip, blocks on the bottoms of the bifurcations, a bushing detachably secured on the shank and a hook proper secured to the bushing.

4. A plating hook comprising a shank, a lip on said shank adapted to rest on a bus bar, a bushing of insulating material detachably secured on the shank and a hook proper secured to the bushing, whereby the hook is free to swing between the bifurcations.

5. A plating hook comprising a shank, a lip on said shank adapted to rest on a bus bar, a bushing detachably secured on the shank and a hook proper secured to the bushing, whereby the hook is free to swing with respect to the shank provided with a covering of non-corrosive material on the lower end.

6. A plating hook comprising a shank having a lip portion adapted to be suspended from a support, a bifurcated portion extending from the shank and having contact surfaces at the bottoms thereof on the same side as the lip and a hook proper pivoted on the opposite side of the shank and adapted to swing back between the bifurcations as to suspend an article to be treated and maintain the same in electrical contact with the contacts on the bifurcations.

7. A device of the class described comprising a shank having a lip adapted to be suspended from a support, bifurcations extending from said shank and having contact surfaces at the bottoms thereof on the same side of the shank with the lip and a hook pivoted on the opposite side of the shank and adapted to swing back between the bifurcations and to support an article to be treated in electrical contact with the contacts upon the bifurcations, said hook extending back to a position wherein the article suspended is directly below the lip.

8. A device of the class described, comprising a handle, a shank extending therefrom, a lip portion on one side of the shank adapted to hook over a support, bifurcations extending from the shank and having contacts thereon on the same side with the lip and a hook pivoted upon the shank on the opposite side thereof and extending back between the bifurcations said hook being insulated from the shank and adapted to suspend an article locked against said contacts.

9. A device of the class described, comprising a handle, a shank extending therefrom, a lip on one side of the shank adapted to hook over a support, downwardly extending bifurcations connected with the shank, said bifurcations having contact faces on the same side with the lip, a pair of lugs on the shank on the side opposite from the lip and contacts, a pin mounted in said lugs, an insulator on the pin, a hook connected to said insulator and adapted to swing back between the bifurcations and to suspend an article in intimate contact with said contact faces.

In testimony whereof I have affixed my signature.

OTTO ROEDEL.